(12) United States Patent
Shoham

(10) Patent No.: US 7,843,940 B2
(45) Date of Patent: Nov. 30, 2010

(54) FILLING TOKEN BUCKETS OF SCHEDULE ENTRIES

(75) Inventor: Doron Shoham, Shoham (IL)

(73) Assignee: Cisco Technology, Inc., San Jose, CA (US)

( * ) Notice: Subject to any disclaimer, the term of this patent is extended or adjusted under 35 U.S.C. 154(b) by 1522 days.

(21) Appl. No.: 11/141,776

(22) Filed: Jun. 1, 2005

(65) Prior Publication Data
US 2006/0274779 A1    Dec. 7, 2006

(51) Int. Cl.
*H04L 12/28*    (2006.01)
(52) U.S. Cl. .................... 370/395.4; 370/450
(58) Field of Classification Search ............ 370/235.1, 370/395.4, 450, 458, 341, 349, 471, 329, 370/395.41, 395.42, 395.21, 395.53, 395.3, 370/336, 389, 236, 345, 376, 343, 394, 412, 370/468; 709/226, 235
See application file for complete search history.

(56) References Cited

U.S. PATENT DOCUMENTS

| | | | |
|---|---|---|---|
| 6,011,798 A * | 1/2000 | McAlpine | 370/395.42 |
| 6,247,061 B1 | 6/2001 | Douceur et al. | |
| 6,381,214 B1 | 4/2002 | Prasad | |
| 6,567,379 B1 | 5/2003 | Walker et al. | |
| 6,950,395 B1 | 9/2005 | Bashandy et al. | |
| 7,065,091 B2 | 6/2006 | Shoham et al. | |
| 7,110,411 B2 * | 9/2006 | Saidi et al. | 370/395.4 |
| 7,212,535 B2 | 5/2007 | Shoham et | |
| 7,385,987 B1 * | 6/2008 | Charny et al. | 370/395.4 |
| 2003/0103514 A1 | 6/2003 | Nam et al. | |
| 2003/0169743 A1 | 9/2003 | Chiussi | |
| 2006/0029080 A1 * | 2/2006 | Kappler et al. | 370/395.4 |

OTHER PUBLICATIONS

Craig Partridge, Gigabit Networking, Addison Wesley Longman, Inc., 1994, pp. 253-263.
S. Keshav, An Engineering Approach to Computer Networking: ATM Networks, The Internet, and The Telephone Network, Addison Wesley Longman, Inc., 1997, Chapter 9, pp. 209-263.
Giroux N et al., "Queuing and Scheduling, Scheduling Mechanisms", Quality of Service in ATM Networks: State-of-the-Art Traffic Management, 1999, pp. 96-109.
M. Shreedhar and George Varghese, "Efficient Fair Queuing Using Deficit Round-Robin," IEEE/ACM Transactions on Networking, IEEE Inc., New York, USA, vol. 4, No. 3, Jun. 1996, pp. 375-385.

* cited by examiner

*Primary Examiner*—Chi H Pham
*Assistant Examiner*—Alexander Boakye
(74) *Attorney, Agent, or Firm*—The Law Office of Kirk D. Williams

(57) ABSTRACT

Disclosed are, inter alia, methods, apparatus, data structures, computer-readable media, and mechanisms, for filling token buckets of schedule entries, such as those used in, but not limited to, a scheduling system used in a computer or communications system (e.g., for sending packets, allocating processing resources, etc.). A scheduling system includes multiple schedule entries with a number of tokens and a last filled slot value. A period of time allocated for periodically updating the number of tokens for all of the schedule entries is divided into the slots, and each schedule entry is associated with a particular fill slot. Each particular schedule entry is repeatedly sequence through and updated during is corresponding slot; while in parallel, a next schedule entry to service is repeatedly identified and updated, while in parallel, ineligible entries schedule to be woken up for the current time slot are made eligible.

36 Claims, 6 Drawing Sheets

**WAKE-UP DATA STRUCTURE

PERIODIC FILL

**ADVANCING CURRENT SLOT

**WAKING SCHEDULE ENTRIES

SERVICE AND FILL

US 7,843,940 B2

FILLING TOKEN BUCKETS OF SCHEDULE ENTRIES

TECHNICAL FIELD

One embodiment of the invention relates to communications and computer systems, especially routers, packet switching systems, and other devices; and more particularly, one embodiment relates to filling token buckets of schedule entries, such as, but those used in scheduling packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards packets. For example, an enqueuing component of such a device receives streams of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are typically maintained in a separate memory. Once the entire packet is written into memory, the packet becomes eligible for processing, and an indicator (e.g., a packet handle) of the packet is typically placed in an appropriate destination queue for being serviced according to some scheduling methodology for packet processing. When this packet processing is complete, the packet is then gathered for sending (e.g., another processing function to build the processed packet to be forwarded based on the packet handle). The packet is then forwarded and the memory previously required for storing the sent packet becomes available for storing new information.

When there is a contention for resources, such as processing contexts, output links of a packet switching system or interface, memory, compute cycles or any other resource, it is important for resources to be allocated or scheduled according to some priority and/or fairness policy. Moreover, the amount of work required to schedule and to enqueue and dequeue a packet or other scheduled item is important, especially as the operating rate of systems increase. Many different mechanisms are available to share resources, and many of which are described hereinafter.

Ordinary time division multiplexing (TDM) is a method commonly used for sharing a common resource between several clients. All scheduled clients are served one at a time at predetermined times and for pre-allocated time periods, which is a very useful property for many applications. This method is often used for multiplexing multiple synchronous items over a higher speed communications link, such as that used for multiplexing multiple telephone calls over a single facility or interleaving packets. However, in a dynamic environment wherein items may not require the full amount of their allocated time slot such as when an item may only require none or only a portion of a particular allocated time slot, then bandwidth of the resource is typically wasted.

Ordinary round-robin (RR) is another method commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly. For example, certain higher priority or larger bandwidth ports or streams of packets may not get their desired amount of bandwidth, which may especially be the case when serving one large and numerous smaller traffic streams or when different priorities of traffic are scheduled.

In some scenarios, high priority (e.g., low latency), guaranteed bandwidth, best effort traffic (e.g., spare bandwidth) and other classifications of traffic compete for a common resource. Various known scheduling methods are designed to provide isolation, prioritization, and fair bandwidth allocation to traffic competing for a common resource. These are known as fair queuing methods. Some examples are Weighted Fair Queuing (WFQ), Self-Clocked Fair Queuing (SCFQ), and Deficit Round Robin/Surplus Round Robin (referred to as DRR).

WFQ and SCFQ depend upon arrival times as well as previous link utilization in order to calculate the next best packet to send. The accepted "ideal" behavior is bit-by-bit or weighted bit-by-bit round robin which assigns each bit of each packet in the system an ideal finish time according to the weighted fair sharing of the system. This is typically not practical in a packet-based system unless all packets are one bit. Generalizing the algorithm from bit-by-bit to packet-by-packet, each packet is assigned an ideal finish (departure) time and the packets are served in order of the earliest departure time. The inclusion of theoretical departure times in a scheduling method typically requires insertion into a sorted list which is known to be an O(log N) problem implemented in software, where N is typically the number of queues. In hardware, this problem may be reduced to an O(1) operation with O(log N) resources.

DRR is a method used for sharing a common resource between several clients with different ratios between clients (i.e., some clients are allowed to consume more of the resources than others). The ratio between clients is typically defined by a parameter called a quantum. There are many variations and different implementations of DRR, including that described hereinafter.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will consume an equal amount of bandwidth.

This DRR approach works in rounds, where a round is one round-robin iteration over the queues that have items to be sent. Typically, when the queue is scheduled, it is allowed to transmit until its deficit becomes negative (or non-positive), and then the next queue is served. Packets coming in on different flows are stored in different queues. Each round, each queue is allocated a quantum worth of bytes, which are added to the deficit of each queue. Each queue is allowed to send out one or more packets in a DRR round, with the exact number of packets being sent in a round being dependent on its quantum and the size of the packets being sent. Typically, as long as the deficit is a positive (or non-negative) value (i.e., it is authorized to send a packet) in a DRR round for a queue and it has one or more packets to send, a packet is sent and its deficit is reduced based on the size of the sent packet. If there are no more packets in a queue after the queue has been serviced, one implementation sets the deficit corresponding to the queue to zero, while one implementation does this only if its deficit is negative. Otherwise, the remaining amount (i.e., the deficit minus the number of bytes sent) is maintained for the next DRR round.

DRR has a complexity of O(1)—that is the amount of work required is a constant and independent of the number of packets enqueued. In order to be work conserving, a packet should be sent every time a queue is scheduled no matter its size. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal." In particular, latency for a system with N queues is Q*N where Q is the average quantum, which must be at least one maximum transmission unit (MTU).

However, in a scheduling system using tokens with a large number of schedule entries, the time required to sequence through each schedule entry and fill its token bucket becomes very long. For a fixed scheduling rate, the number of tokens that must be added each time during each fill period for a very long filling is typically proportional to the number of schedule entries, and therefore, the number of tokens added each time is relatively large, which increases the burstiness in the servicing of schedule entries and their corresponding entities/items (e.g., sending of packets, processing of tasks, etc.).

SUMMARY

Disclosed are, inter alia, methods, apparatus, data structures, computer-readable media, and mechanisms, for filling token buckets of schedule entries, such as those used in, but not limited to, a scheduling system used in a computer or communications system (e.g., for sending packets, allocating processing resources, etc.). One embodiment used with a scheduling system includes multiple schedule entries, with each schedule entry including a number of tokens and a last filled slot value. Each of the schedule entries is associated with a fill slot, wherein a period oaf time allocated for periodically updating the number of tokens for all of said schedule entries is divided into the slots. A current slot is maintained, and repeatedly advanced to a next current slot after a predetermined time period or after filling tokens for all of the schedule entries assigned to the slot, etc. Each particular schedule entry is repeatedly sequenced through and updated, while in parallel, repeatedly, a next schedule entry to service is identified and updated, while in parallel, ineligible entries to be woken up for the current time slot are made eligible.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
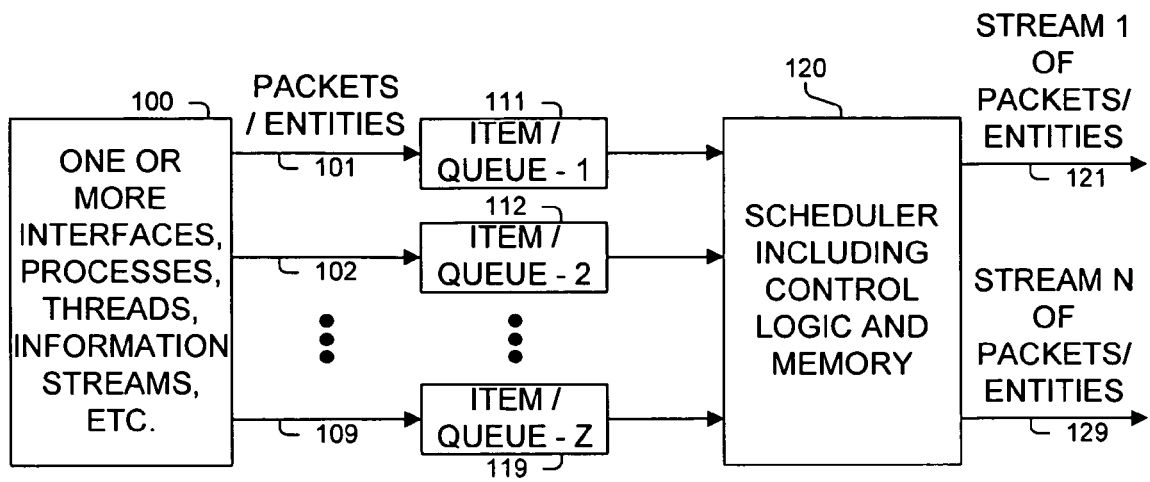
FIG. 1 is a block diagram of one embodiment for scheduling entities and items.

Disclosed are, inter alia, methods, apparatus, data structures, computer-readable media, and mechanisms, for filling token buckets of schedule entries, such as those used in, but not limited to, a scheduling system used in a computer or communications system (e.g., for sending packets, allocating processing resources, etc.).

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for filling token buckets of schedule entries, such as those used in, but not limited to, a scheduling system used in a computer or communications system (e.g., for sending packets, allocating processing resources, etc.). One embodiment used with a scheduling system includes multiple schedule entries, with each schedule entry including a number of tokens and a last filled slot value. Each of the schedule entries is associated with a fill slot, wherein a period of time allocated for periodically updating the number of tokens for all of said schedule entries is divided into the slots. A current slot is maintained, and repeatedly advanced to a next current slot after a predetermined time period or after filling tokens for all of the schedule entries assigned to the slot, etc. Each particular schedule entry is repeatedly sequenced through and updated, while in parallel, repeatedly, a next schedule entry to service is identified and updated, while in parallel, ineligible entries to be woken up for the current time slot are made eligible.

Note, "in parallel" is used to describe that these processes are conducted in parallel, and is not limited to the case where specific steps of these processes are performed simultaneously. For example, one embodiment uses different processing elements or custom hardware for performing various aspects of these processes; while in one embodiment, a single processor is used to perform all of these operations.

The updating of schedule entries typically includes adjusting its said number of tokens. In one embodiment, for the case where the updated schedule entry will be eligible after adjusting its number of tokens, its number of tokens is increased by an amount based on its token slot fill rate and the number of slots identified by the current time slot since its said last filled slot value, and the schedule entry is marked as eligible for servicing. In one embodiment, for the case where the updated schedule entry will be ineligible after said adjusting its number of tokens but would be eligible at a particular slot before a next occurrence of its periodic fill slot, its number of tokens are increased by an amount based on its token slot fill rate and the number of slots identified by the particular slot since its said last filled slot value, the schedule entry is marked as ineligible for servicing, and it is scheduled to be woken up at the particular slot where it would become eligible. In one embodiment, for the case where said updating schedule entry will be ineligible after said adjusting its said number of tokens and at least until a next occurrence of its said associated fill slot, its said number of tokens is increased by an amount based on its token slot fill rate and the number of slots identified by the current time slot since its said last filled slot value. In one embodiment, updating a serviced schedule entry includes reducing its said number of tokens by an amount corresponding to the servicing (e.g., a number of bytes of a sent packet, an amount of processing time for a task, etc.).

One embodiment includes a method for use with a scheduling system including a plurality of schedule entries, each of the schedule entries including a number of tokens and a last filled slot value, each of the schedule entries associated with a fill slot of a plurality of fill slots, wherein a period of time allocated for periodically updating said number of tokens for all of said schedule entries is divided into the plurality of slots, the method comprising: maintaining a current slot of the plurality of slots, said maintaining including repeatedly advancing the current slot to a next current slot; and repeatedly sequencing through each particular schedule entry of the plurality of schedule entries and updating said particular schedule entry, while in parallel repeatedly identifying a next schedule entry to service and updating said next schedule entry, while in parallel identifying ineligible entries scheduled to be woken up for the current time slot and making said ineligible entries eligible.

In one embodiment, said updating said updating schedule entry of a group of said particular schedule entry and said next schedule entry includes adjusting its said number of tokens, wherein said updating includes for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updated schedule entry as eligible at least if it was not currently marked as eligible. In one embodiment, n said updating the updating schedule entry for said next schedule entry further includes reducing its said number of tokens by an amount corresponding to said servicing. In one embodiment, said updating said updating schedule entry of a group of said particular schedule entry and said next schedule entry includes adjusting its said number of tokens, wherein said updating includes: for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updated schedule entry is ineligible at least if it was not currently marked as ineligible, and scheduling said updating schedule entry to be woken up at the particular slot. In one embodiment, said updating the updating schedule entry for said next schedule entry further includes reducing its said number of tokens by an amount corresponding to said servicing. In one embodiment, said updating said updating schedule entry of a group of said particular schedule entry and said next schedule entry includes adjusting its said number of tokens, wherein said updating includes: for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value. In one embodiment, said updating the updating schedule entry for said next schedule entry further includes reducing its said number of tokens by an amount corresponding to said servicing. In one embodiment, said updating said updating schedule entry of a group of said particular schedule entry and said next schedule entry includes adjusting its said number of tokens, wherein said updating includes: (a) for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updated schedule entry as eligible at least if it was not currently marked as eligible; (b) for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updated schedule entry is ineligible at least if it was not currently marked as ineligible, and scheduling said updating schedule entry to be woken up at the particular slot; and (c) for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value; and wherein said updating the updating schedule entry for said next schedule entry further includes reducing its said number of tokens by an amount corresponding to said servicing.

One embodiment includes one or more computer-readable media containing computer-executable instructions for performing operations for use with a scheduling system including a plurality of schedule entries, each of the schedule entries including a number of tokens and a last filled slot value, each of the schedule entries associated with a fill slot of a plurality of fill slots, wherein a period of time allocated for periodically updating said number of tokens for all of said schedule entries is divided into the plurality of slots, said operations comprising: maintaining a current slot of the plurality of slots, said maintaining including repeatedly advancing the current slot to a next current slot; and repeatedly sequencing through each particular schedule entry of the plurality of schedule entries and updating said particular schedule entry, while in parallel repeatedly identifying a next schedule entry to service and updating said next schedule entry, while in parallel identifying ineligible entries scheduled to be woken up for the current time slot and making said ineligible entries eligible.

In one embodiment, said updating said updating schedule entry of a group of said particular schedule entry and said next schedule entry includes adjusting its said number of tokens, wherein said updating includes for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updated schedule entry as eligible at least if it was not currently marked as eligible. In one embodiment, said updating the updating schedule entry for said next schedule entry further includes reducing its said number of tokens by an amount corresponding to said servicing. In one embodiment, said updating said updating schedule entry of a group of said particular schedule entry and said next schedule entry includes adjusting its said number of tokens, wherein said updating includes: for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updated schedule entry is ineligible at least if it was not currently marked as ineligible, and scheduling said updating schedule entry to be woken up at the particular slot. In one embodiment, said updating the updating schedule entry for said next schedule entry further includes reducing its said number of tokens by an amount corresponding to said servicing. In one embodiment, said updating said updating schedule entry of a group of said particular schedule entry and said next schedule entry includes adjusting its said number of tokens, wherein said updating includes: for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value. In one embodiment, said updating the updating schedule entry for said next schedule entry further includes reducing its said number of tokens by an amount corresponding to said servicing. In one embodiment, said updating said updating schedule entry of a group of said particular schedule entry and said next schedule entry includes adjusting its said number of tokens, wherein said updating includes: (a) for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updated schedule entry as eligible at least if it was not currently marked as eligible; (b) for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updated schedule entry is ineligible at least if it was not currently marked as ineligible, and scheduling said updating schedule entry to be woken up at the particular slot; and (c) for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value; and wherein said updating the updating schedule entry for said next schedule entry further includes reducing its said number of tokens by an amount corresponding to said servicing.

One embodiment includes an apparatus for use with a scheduling system including a plurality of schedule entries, each of the schedule entries including a number of tokens and a last filled slot value, each of the schedule entries associated with a fill slot of a plurality of fill slots, wherein a period of time allocated for periodically updating said number of tokens for all of said schedule entries is divided into the plurality of slots, the method comprising: means for maintaining a current slot of the plurality of slots, said maintaining including repeatedly advancing the current slot to a next current slot; and means for repeatedly sequencing through each particular schedule entry of the plurality of schedule entries and updating said particular schedule entry, while in parallel repeatedly identifying a next schedule entry to service and updating said next schedule entry, while in parallel identifying ineligible entries scheduled to be woken up for the current time slot and making said ineligible entries eligible.

In one embodiment, updating said updating schedule entry of a group of said particular schedule entry and said next schedule entry includes adjusting its said number of tokens, wherein said updating includes for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updated schedule entry as eligible at least if it was not currently marked as eligible. In one embodiment, said updating the updating schedule entry for said next schedule entry further includes reducing its said number of tokens by an amount corresponding to said servicing. In one embodiment, said updating said updating schedule entry of a group of said particular schedule entry and said next schedule entry includes adjusting its said number of tokens, wherein said updating includes: for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updated schedule entry is ineligible at least if it was not currently marked as ineligible, and scheduling said updating schedule entry to be woken up at the particular slot. In one embodiment, said updating the updating schedule entry for said next schedule entry further includes reducing its said number of tokens by an amount corresponding to said servicing. In one embodiment, said updating said updating schedule entry of a group of said particular schedule entry and said next schedule entry includes adjusting its said number of tokens, wherein said updating includes: for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value. In one embodiment, said updating the updating schedule entry for said next schedule entry further includes reducing its said number of tokens by an amount corresponding to said servicing. In one embodiment, wherein said updating said updating schedule entry of a group of said particular schedule entry and said next schedule entry includes adjusting its said number of tokens, wherein said updating includes: (a) for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updated schedule entry as eligible at least if it was not currently marked as eligible; (b) for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updated schedule entry is ineligible at least if it was not currently marked as ineligible, and scheduling said updating schedule entry to be woken up at the particular slot; and (c) for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value; and wherein said updating the updating schedule entry for said next schedule entry further includes reducing its said number of tokens by an amount corresponding to said servicing.

Turning to the figures, FIG. 1 illustrates one embodiment of a system such as, but not limited to a computer or communications system, which schedules entities and/or items. Packets or other entities or indications thereof 101-109 to be scheduled are received from one or more interfaces, processes, threads, information streams, or other sources 100. These packets or other entities 101-109 are typically stored in items/queues 111-119 for scheduling by scheduler 120. In one embodiment, such as that processing packets or communication streams, scheduler 120 processes one or more streams of packets or other entities 101-109 to produce one or more streams of outputs 121-129. For example, in one embodiment, streams of packets 101-109 are stored in queues 111-119. Scheduler 120 schedules packets from queues 111-119 to produce one or more streams of packets 121-129.

Figure 2:
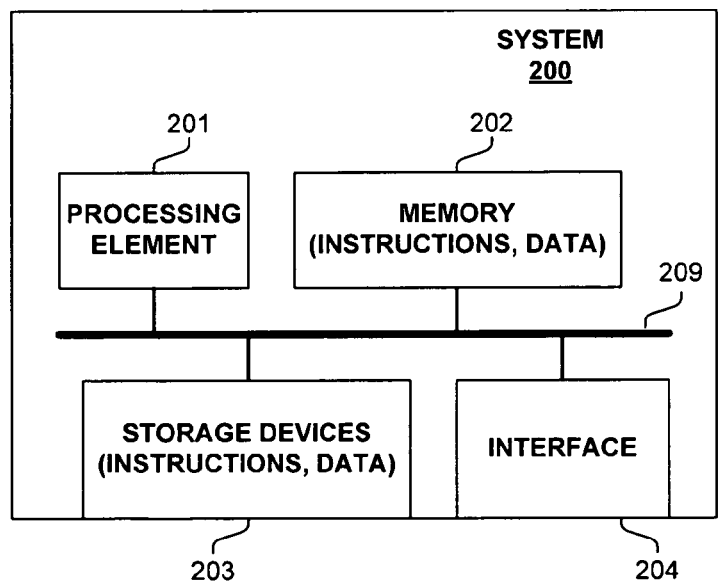
FIG. 2 is a block diagram of one embodiment for scheduling entities and items.

FIG. 2 is a block diagram of an exemplary system or component 200 used in one embodiment for scheduling entities and/or items, including for filling token buckets of schedule entries. In one embodiment, system or component 200 performs one or more processes corresponding to one of the flow diagrams illustrated or otherwise described herein.

In one embodiment, system or component 200 includes a processing element 201 (e.g., a processor, customized logic, etc.), memory 202, storage devices 203, and an interface 204 for receiving and sending packets, items, and/or other information and/or controlling other processes or updating external data structures, etc. Elements 201-204 are typically coupled via one or more communications mechanisms 209 (shown as a bus for illustrative purposes.) Various embodiments of component 200 may include more or less elements.

The operation of component 200 is typically controlled by processing element 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data (e.g., one or more of the data structures illustrated in FIGS. 3A-B) which is manipulated by processing element 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data (e.g., one or more of the data structures illustrated in FIGS. 3A-B) which is manipulated by processing element 201 for implementing functionality in accordance with the invention.

Figure 3A:
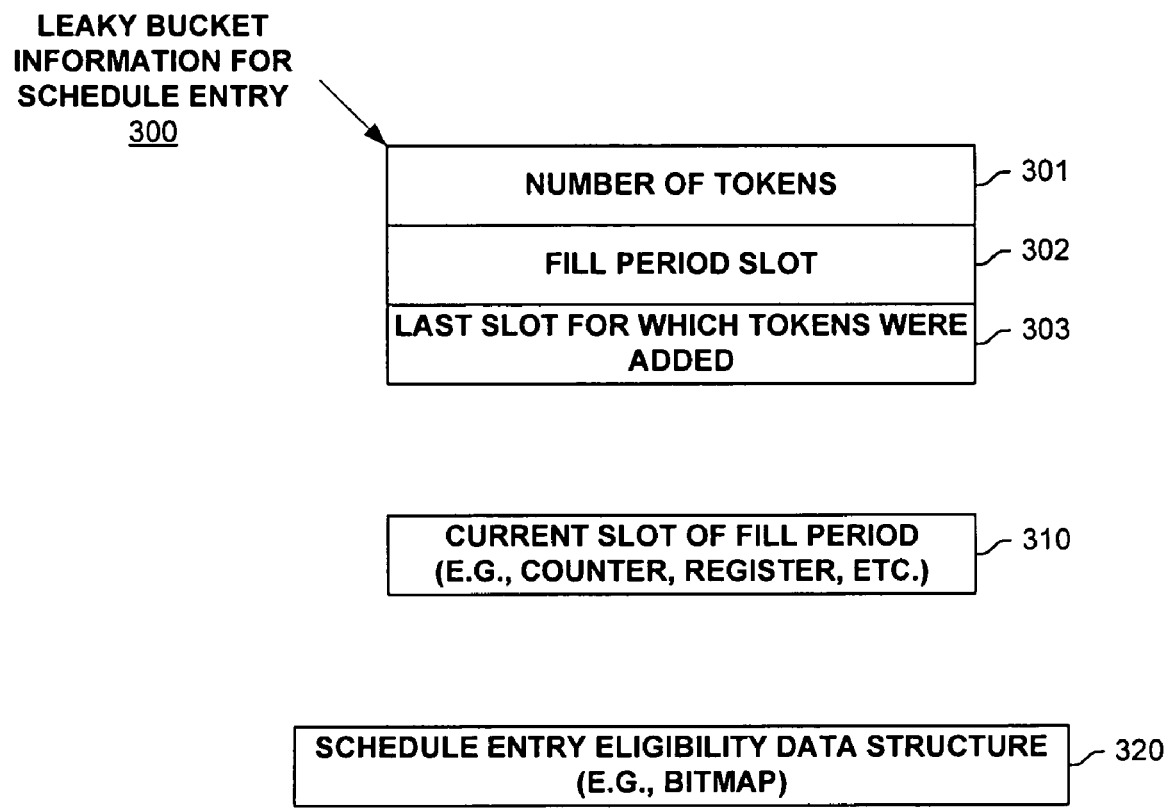
FIGS. 3A-B are block diagrams of data structures used in one embodiment.
Figure 3B:
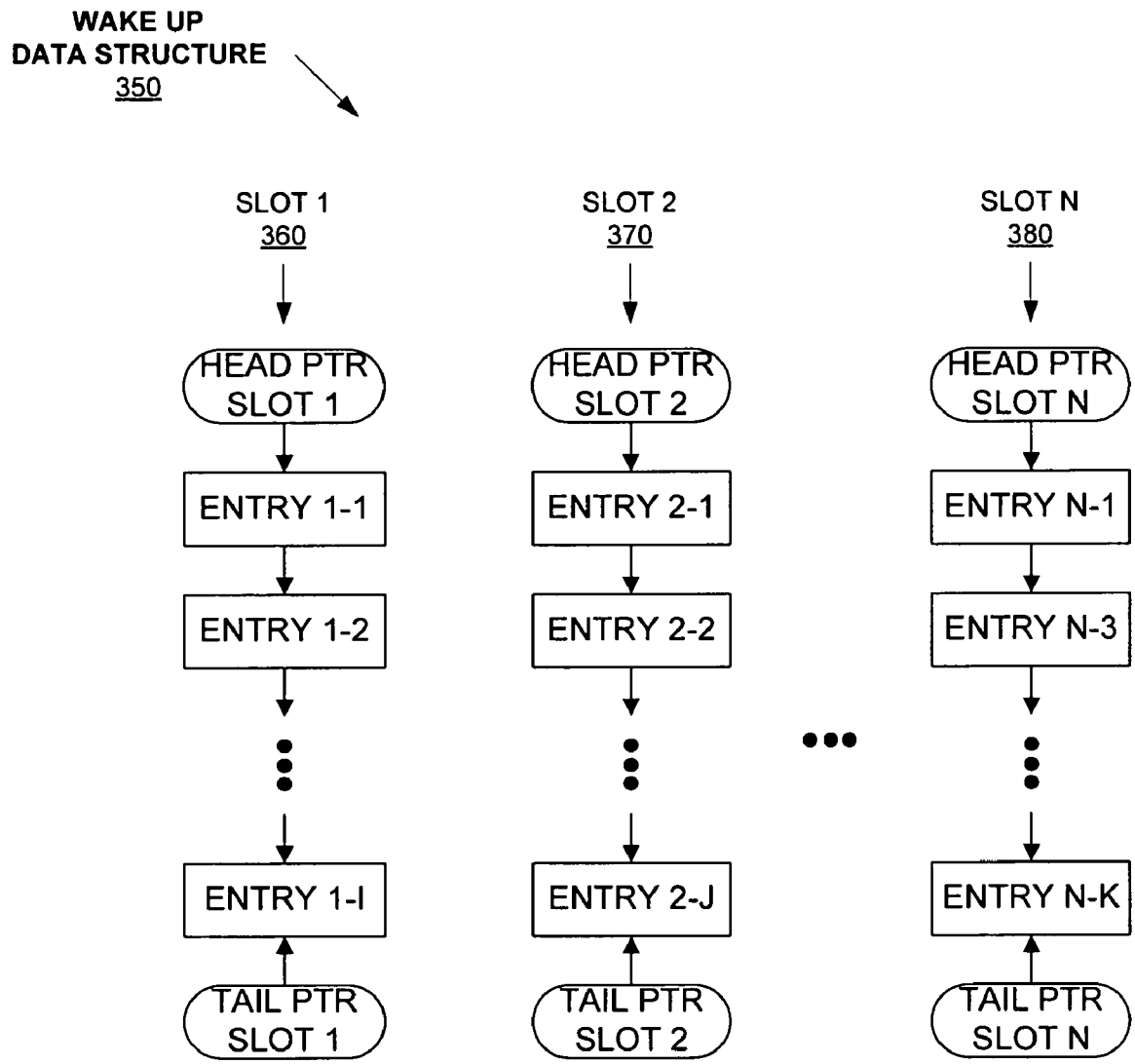

FIGS. 3A-3B illustrate exemplary data structures used in one embodiment. Leaky bucket information 300 for each schedule entry typically includes a current number of tokens value 301 (e.g., the token bucket), a fill period slot 302 associated with the schedule entry, and a last slot for which tokens were added field 303. Note, as well-known, a schedule entry typically includes other scheduling information for performing the schedule operation as well as identifying its corresponding item/entity to service (e.g., via a pointer or some other indication).

One embodiment also maintains a current slot of the fill period 310, which is typically a counter or a register which is repeatedly advanced, such as, but not limited to, after a predetermined time or after all associated schedule entries have been periodically updated. One embodiment includes one or more data structures (e.g. a bitmap) 320 to identify which schedule entries are eligible for servicing and which schedule entries are ineligible. In a typical prior system, the eligibility of a schedule entry is typically identified by its number of tokens 301 (e.g., eligible if greater than or equal to a predetermined number, such as zero). However, as a schedule entry may be updated with additional tokens which would make it eligible prior to the slot in which it should have received these additional tokens, the current eligibility of each schedule entry is maintained in data structure 320 in one embodiment. In one embodiment, data structure 320 includes an eligibility bitmap with each bit representing the eligibility of a corresponding schedule entry.

FIG. 3B illustrates an exemplary data structure 350 for identifying schedule entries to be woken up for a particular slot used in one embodiment. One embodiment uses a linked list data structure, with a linked list (360, 370, 380) used for each slot to easily identify each of the schedule entries which are to be woken up for the corresponding slot. Thus, scheduling of a entry to be woken up in a particular time slot includes adding a representation of the schedule entry to the corresponding list. One embodiment includes multiple priority lists for each slot, such that higher bandwidth or priority entries will be woken up first. Also, in one embodiment, if all entries cannot be woken up in a time slot, the remaining entries are moved to the front of the list for the next slot.

Figure 4:
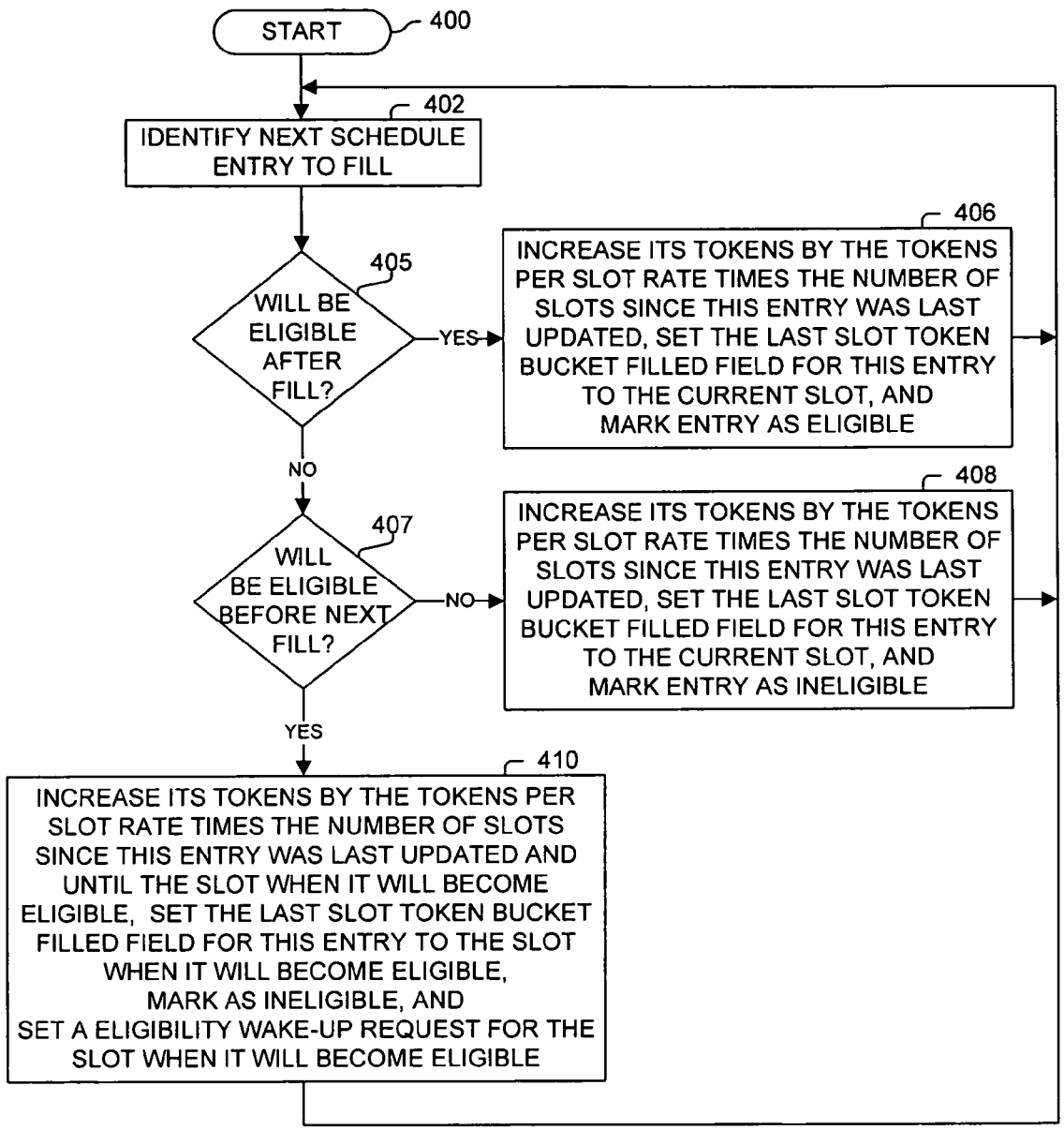
FIG. 4 is a flow diagram illustrating a process used in one embodiment for periodically updating the number of tokens in each of the schedule entries.

FIG. 4 is a flow diagram illustrating a process used in one embodiment for periodically updating the number of tokens in each of the schedule entries. Processing begins with process block 400, and proceeds to process block 402, wherein a next schedule entry to fill is identified. As determined in process block 405, if the schedule entry will be eligible after its number of tokens is updated, then in process block 406, its number of tokens is increased by an amount based on its token slot fill rate and the number of slots identified by the current time slot since its said last filled slot value, and the schedule entry is marked as eligible for servicing. Otherwise, as determined in process block 407, if the schedule will be ineligible after said adjusting its number of tokens but would be eligible at a particular slot before a next occurrence of its periodic fill slot, then in process block 410, its number of tokens are increased by an amount based on its token slot fill rate and the number of slots identified by the particular slot since its said last filled slot value, the schedule entry is marked as ineligible for servicing, and it is scheduled to be woken up at the particular slot where it would become eligible. Otherwise, in process block 408, the schedule entry's number of tokens is increased by an amount based on its token slot fill rate and the number of slots identified by the current time slot since its said last filled slot value, and the schedule entry remains ineligible. Processing then returns to process block 402. Note, in one embodiment, after all schedule entries associated with a particular slot have been updated (e.g., filled with tokens), the updating of schedule entries pauses until the next time slot before updating any more schedule entries.

Figure 5:
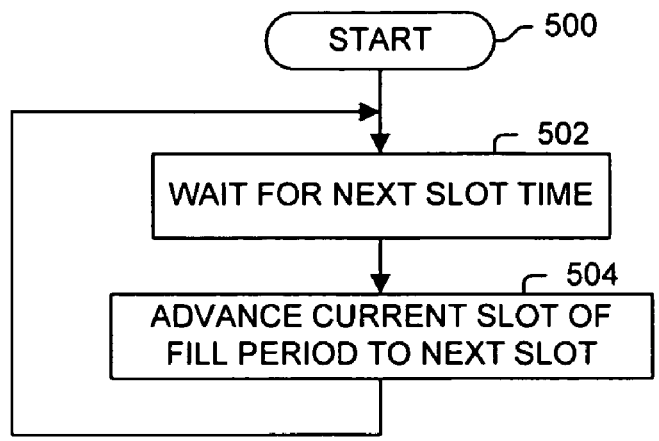
FIG. 5 is a flow diagram illustrating a process used in one embodiment for advancing the current slot identifier.

FIG. 5 is a flow diagram illustrating a process used in one embodiment for advancing the current slot identifier. Processing begins with process block 500, and proceeds to process block 502, wherein processing waits for the time for the next time slot. In process block 504, the current time slot is advanced to the next time slot; an processing returns to process block 502.

Figure 6:
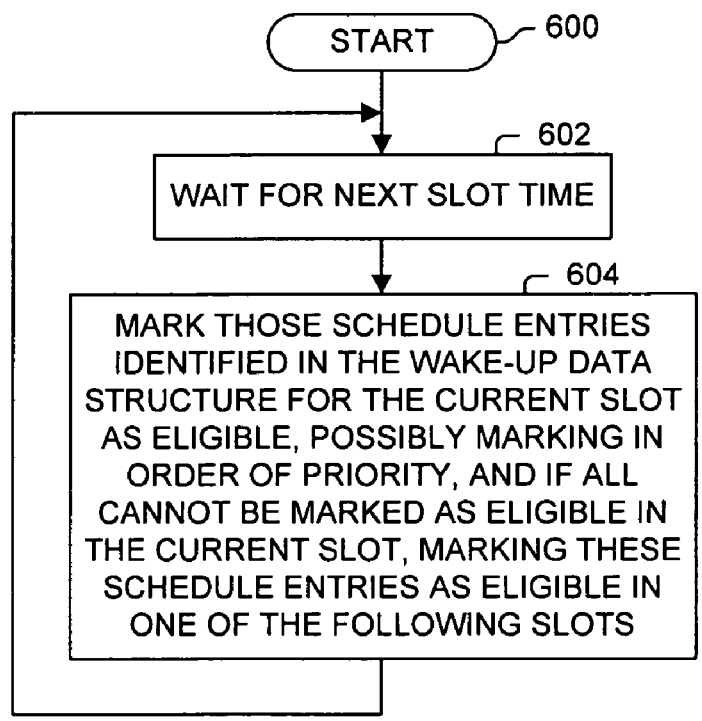
FIG. 6 is a flow diagram illustrating a process used in one embodiment for waking schedule entries scheduled to be waken up during a particular slot.

FIG. 6 is a flow diagram illustrating a process used in one embodiment for waking schedule entries scheduled to be waken up during a particular slot. Processing begins with process block 600, and proceeds to process block 602, wherein processing waits for the time for the next time slot. In process block 604, those schedule entries scheduled to be woken up during this time slot are marked as eligible, such as by sequencing through a linked list (360, 370, 380 of FIG. 3B). In one embodiment, higher priority schedule entries are marked eligible before lower priority schedule entries. In one embodiment, if all schedule entries cannot be marked as eligible during the current slot, they are marked as eligible in the one of the following slots. Processing returns to process block 602.

Figure 7:
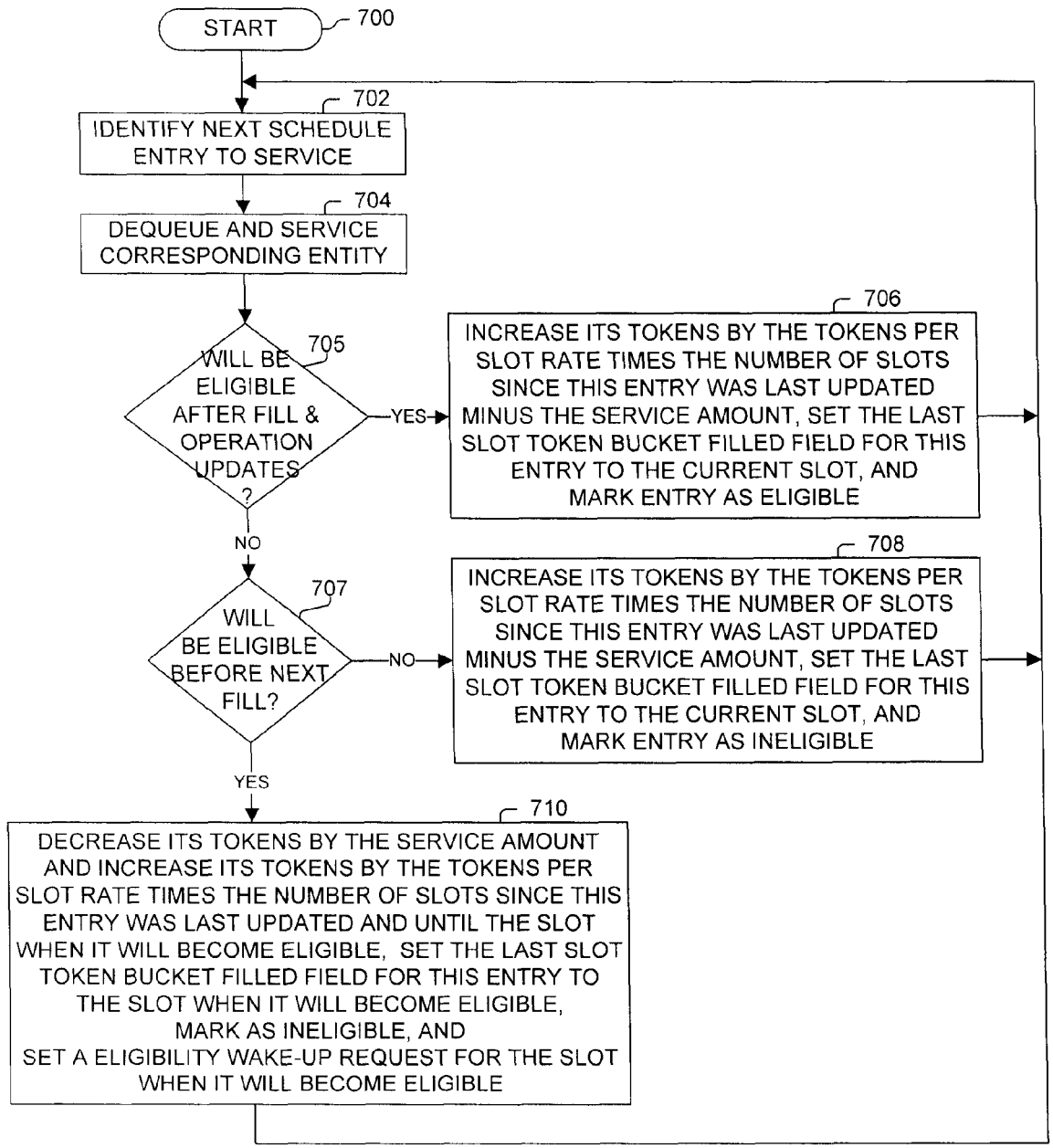
FIG. 7 is a flow diagram illustrating a process used in one embodiment for servicing and filling schedule entries.

FIG. 7 is a flow diagram illustrating a process used in one embodiment for servicing and filling schedule entries. Processing begins with process block 700, and proceeds to process block 702, wherein a next schedule entry to fill is identified to service is identified. In process block 704, an entity corresponding to the schedule entry is dequeued and serviced. As determined in process block 705, if the schedule entry will be eligible after its number of tokens is updated, then in process block 706, its number of tokens is increased by an amount based on its token slot fill rate and the number of slots identified by the current time slot since its said last filled slot value and reducing by an amount corresponding to the servicing (e.g., a number of bytes of a sent packet, an amount of processing time for a task, etc.), and the schedule entry is marked as eligible for servicing. Otherwise, as determined in process block 707, if the schedule will be ineligible after said adjusting its number of tokens but would be eligible at a particular slot before a next occurrence of its periodic fill slot, then in process block 710, its number of tokens are increased by an amount based on its token slot fill rate and the number of slots identified by the particular slot since its said last filled slot value and reducing by an amount corresponding to the servicing, the schedule entry is marked as ineligible for servicing, and it is scheduled to be woken up at the particular slot where it would become eligible. Otherwise, in process block 708, the schedule entry's number of tokens is increased by an amount based on its token slot fill rate and the number of slots identified by the current time slot since its said last filled slot value and reducing by an amount corresponding to the servicing, and the schedule entry remains ineligible. Processing then returns to process block 702. Note, in one embodiment, after all schedule entries associated with a particular slot have been updated (e.g., filled with tokens), the updating of schedule entries pauses until the next time slot before updating any more schedule entries.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, performed by a particular machine, for use with a scheduling system including a plurality of schedule entries, each of the schedule entries including a number of tokens and a last filled slot value, each of the schedule entries associated with a fill slot of a plurality of fill slots, wherein a period of time allocated for periodically updating said number of tokens for all of said schedule entries is divided into the plurality of fill slots, the method comprising:

employing a scheduler of the particular machine to perform steps, with said steps including:

maintaining a current slot of the plurality of fill slots, said maintaining including repeatedly advancing the current slot to a next current slot; and repeatedly sequencing through each particular schedule entry of the plurality of schedule entries and updating said particular schedule entry, while in parallel repeatedly identifying a next schedule entry to service and updating said next schedule entry, while in parallel identifying ineligible entries scheduled to be woken up for the current time slot and making said ineligible entries eligible.

2. The method of claim 1, wherein said updating an updating schedule entry of a group of said particular schedule entry and said next schedule entry includes adjusting its said number of tokens, wherein said updating includes for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updating schedule entry as eligible at least if it was not currently marked as eligible.

3. The method of claim 2, including servicing an entity corresponding to said identified next schedule entry to service; wherein said updating the updating schedule entry corresponding to said next schedule entry further includes reducing its said number of tokens by an amount corresponding to said servicing.

4. The method of claim 1, wherein said updating an updating schedule entry of a group of said particular schedule entry and said next schedule entry includes adjusting its said number of tokens, wherein said updating includes: for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updating schedule entry is ineligible at least if it was not currently marked as ineligible, and scheduling said updating schedule entry to be woken up at the particular slot.

5. The method of claim 4, including servicing an entity corresponding to said identified next schedule entry to service; wherein said updating the updating schedule entry corresponding to said next schedule entry further includes reducing its said number of tokens by an amount corresponding to said servicing.

6. The method of claim 1, wherein said updating an updating schedule entry of a group of said particular schedule entry and said next schedule entry includes adjusting its said number of tokens, wherein said updating includes: for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value.

7. The method of claim 6, including servicing an entity corresponding to said identified next schedule entry to service; wherein said updating the updating schedule entry corresponding to said next schedule entry further includes reducing its said number of tokens by an amount corresponding to said servicing.

8. The method of claim 1, including servicing an entity corresponding to said identified next schedule entry to service; wherein said updating an updating schedule entry of a group of said particular schedule entry and said next schedule entry includes adjusting its said number of tokens, wherein said updating includes:

(a) for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updating schedule entry as eligible at least if it was not currently marked as eligible;

(b) for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updating schedule entry is ineligible at least if it was not currently marked as ineligible, and scheduling said updating schedule entry to be woken up at the particular slot; and (c) for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value; and wherein said updating the updating schedule entry corresponding to said next schedule entry further includes reducing its said number of tokens by an amount corresponding to said servicing.

9. The method of claim 1, including servicing an entity corresponding to said identified next schedule entry to service.

10. One or more non-transitory computer-readable media encoded with computer-executable instructions for performing operations for use with a scheduling system including a plurality of schedule entries, each of the schedule entries including a number of tokens and a last filled slot value, each of the schedule entries associated with a fill slot of a plurality of fill slots, wherein a period of time allocated for periodically updating said number of tokens for all of said schedule entries is divided into the plurality of fill slots, said operations comprising:

maintaining a current slot of the plurality of fill slots, said maintaining including repeatedly advancing the current slot to a next current slot; and repeatedly sequencing through each particular schedule entry of the plurality of schedule entries and updating said particular schedule entry, while in parallel repeatedly identifying a next schedule entry to service and updating said next schedule entry, while in parallel identifying ineligible entries scheduled to be woken up for the current time slot and making said ineligible entries eligible.

11. The non-transitory computer-readable media of claim 10, wherein said updating an updating schedule entry of a group of said particular schedule entry and said next schedule entry includes adjusting its said number of tokens, wherein said updating includes for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updating schedule entry as eligible at least if it was not currently marked as eligible.

12. The non-transitory computer-readable media of claim 11, wherein said operations include servicing an entity corresponding to said identified next schedule entry to service; wherein said updating the updating schedule entry corresponding to said next schedule entry further includes reducing its said number of tokens by an amount corresponding to said servicing.

13. The non-transitory computer-readable media of claim 10, wherein said updating an updating schedule entry of a group of said particular schedule entry and said next schedule entry includes adjusting its said number of tokens, wherein said updating includes: for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updating schedule entry is ineligible at least if it was not currently marked as ineligible, and scheduling said updating schedule entry to be woken up at the particular slot.

14. The non-transitory computer-readable media medium of claim 13, wherein said operations include servicing an entity corresponding to said identified next schedule entry to service; wherein said updating the updating schedule entry corresponding to said next schedule entry further includes reducing its said number of tokens by an amount corresponding to said servicing.

15. The non-transitory computer-readable media of claim 10, wherein said updating an updating schedule entry of a group of said particular schedule entry and said next schedule entry includes adjusting its said number of tokens, wherein said updating includes: for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value.

16. The non-transitory computer-readable media of claim 15, wherein said operations include servicing an entity corresponding to said identified next schedule entry to service; wherein said updating the updating schedule entry corresponding to said next schedule entry further includes reducing its said number of tokens by an amount corresponding to said servicing.

17. The non-transitory computer-readable media of claim 10, wherein said operations include servicing an entity corresponding to said identified next schedule entry to service; wherein said updating an updating schedule entry of a group of said particular schedule entry and said next schedule entry includes adjusting its said number of tokens, wherein said updating includes:

(a) for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updating schedule entry as eligible at least if it was not currently marked as eligible;

(b) for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updating schedule entry is ineligible at least if it was not currently marked as ineligible, and scheduling said updating schedule entry to be woken up at the particular slot; and (c) for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value; and wherein said updating the updating schedule entry corresponding to said next schedule entry further includes reducing its said number of tokens by an amount corresponding to said servicing.

18. The non-transitory computer-readable media of claim 10, wherein said operations include servicing an entity corresponding to said identified next schedule entry to service.

19. An apparatus for use with a scheduling system including a plurality of schedule entries, each of the schedule entries including a number of tokens and a last filled slot value, each of the schedule entries associated with a fill slot of a plurality of fill slots, wherein a period of time allocated for periodically updating said number of tokens for all of said schedule entries is divided into the plurality of fill slots, the apparatus comprising:

means for maintaining a current slot of the plurality of fill slots, said maintaining including repeatedly advancing the current slot to a next current slot; and means for repeatedly sequencing through each particular schedule entry of the plurality of schedule entries and updating said particular schedule entry, while in parallel repeatedly identifying a next schedule entry to service and updating said next schedule entry, while in parallel identifying ineligible entries scheduled to be woken up for the current time slot and making said ineligible entries eligible;

wherein said means for maintaining the current slot of the plurality of fill slots, and said means for repeatedly sequencing through each particular schedule entry of the plurality of schedule entries and updating said particular schedule entry, while in parallel repeatedly identifying a next schedule entry to service and updating said next schedule entry, while in parallel identifying ineligible entries scheduled to be woken up for the current time slot and making said ineligible entries eligible include control logic or one or more processing elements.

20. The apparatus of claim 19, wherein said updating an updating schedule entry of a group of said particular schedule entry and said next schedule entry includes adjusting its said number of tokens, wherein said updating includes for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updating schedule entry as eligible at least if it was not currently marked as eligible.

21. The apparatus of claim 20, including means for servicing an entity corresponding to said identified next schedule entry to service; wherein said updating the updating schedule entry corresponding to said next schedule entry further includes reducing its said number of tokens by an amount corresponding to said servicing.

22. The apparatus of claim 19, wherein said updating an updating schedule entry of a group of said particular schedule entry and said next schedule entry includes adjusting its said number of tokens, wherein said updating includes: for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updating schedule entry is ineligible at least if it was not currently marked as ineligible, and scheduling said updating schedule entry to be woken up at the particular slot.

23. The apparatus of claim 22, including means for servicing an entity corresponding to said identified next schedule entry to service; wherein said updating the updating schedule entry corresponding to said next schedule entry further includes reducing its said number of tokens by an amount corresponding to said servicing.

24. The apparatus of claim 19, wherein said updating an updating schedule entry of a group of said particular schedule entry and said next schedule entry includes adjusting its said number of tokens, wherein said updating includes: for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value.

25. The apparatus of claim 24, including means for servicing an entity corresponding to said identified next schedule entry to service; wherein said updating the updating schedule entry corresponding to said next schedule entry further includes reducing its said number of tokens by an amount corresponding to said servicing.

26. The apparatus of claim 19, including means for servicing an entity corresponding to said identified next schedule entry to service; wherein said updating an updating schedule entry of a group of said particular schedule entry and said next schedule entry includes adjusting its said number of tokens, wherein said updating includes:
   (a) for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updating schedule entry as eligible at least if it was not currently marked as eligible;
   (b) for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updating schedule entry is ineligible at least if it was not currently marked as ineligible, and scheduling said updating schedule entry to be woken up at the particular slot; and
   (c) for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value; and
wherein said updating the updating schedule entry corresponding to said next schedule entry further includes reducing its said number of tokens by an amount corresponding to said servicing.

27. The apparatus of claim 19, including means for servicing an entity corresponding to said identified next schedule entry to service.

28. An apparatus, including:
   one or more processing elements and memory for use in implementing a scheduling system including a plurality of schedule entries, each of the schedule entries including a number of tokens and a last filled slot value, each of the schedule entries associated with a fill slot of a plurality of fill slots, wherein a period of time allocated for periodically updating said number of tokens for all of said schedule entries is divided into the plurality of fill slots;
   wherein said one or more processing elements are configured to perform operations, with said operations including:
   maintaining a current slot of the plurality of fill slots, said maintaining including repeatedly advancing the current slot to a next current slot; and
   repeatedly sequencing through each particular schedule entry of the plurality of schedule entries and updating said particular schedule entry, while in parallel repeatedly identifying a next schedule entry to service and updating said next schedule entry, while in parallel identifying ineligible entries scheduled to be woken up for the current time slot and making said ineligible entries eligible.

29. The apparatus of claim 28, wherein said updating an updating schedule entry of a group of said particular schedule entry and said next schedule entry includes adjusting its said number of tokens, wherein said updating includes for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updating schedule entry as eligible at least if it was not currently marked as eligible.

30. The apparatus of claim 29, wherein said operating include: servicing an entity corresponding to said identified next schedule entry to service; wherein said updating the updating schedule entry corresponding to said next schedule entry further includes reducing its said number of tokens by an amount corresponding to said servicing.

31. The apparatus of claim 28, wherein said updating an updating schedule entry of a group of said particular schedule entry and said next schedule entry includes adjusting its said number of tokens, wherein said updating includes: for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updating schedule entry is ineligible at least if it was not currently marked as ineligible, and scheduling said updating schedule entry to be woken up at the particular slot.

32. The apparatus of claim 31, wherein said operating include: servicing an entity corresponding to said identified next schedule entry to service; wherein said updating the updating schedule entry corresponding to said next schedule entry further includes reducing its said number of tokens by an amount corresponding to said servicing.

33. The apparatus of claim 28, wherein said updating an updating schedule entry of a group of said particular schedule entry and said next schedule entry includes adjusting its said number of tokens, wherein said updating includes: for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value.

34. The apparatus of claim 33, wherein said operating include: servicing an entity corresponding to said identified next schedule entry to service; wherein said updating the updating schedule entry corresponding to said next schedule entry further includes reducing its said number of tokens by an amount corresponding to said servicing.

35. The apparatus of claim 28, wherein said operating include: servicing an entity corresponding to said identified next schedule entry to service.

36. The apparatus of claim 28, wherein said operating include: servicing an entity corresponding to said identified next schedule entry to service; wherein said updating an updating schedule entry of a group of said particular schedule entry and said next schedule entry includes adjusting its said number of tokens, wherein said updating includes:

(a) for the case where said updating schedule entry will be eligible after said adjusting its said number of tokens: said adjusting its said number of tokens includes: increasing its number of tokens by an amount based on its token slot fill rate and the number of slots identified by the current time slot since its said last filled slot value, and marking said updating schedule entry as eligible at least if it was not currently marked as eligible;

(b) for the case where said updating schedule entry will be ineligible after said adjusting its number of tokens but would be eligible at a particular slot before a next occurrence of the fill slot associated with said updating schedule entry if tokens where added for each next current slot: said adjusting its said number of tokens includes: increasing its number of tokens by an amount based on its token slot fill rate and the number of slots identified by the particular slot since its said last filled slot value, marking said updating schedule entry is ineligible at least if it was not currently marked as ineligible, and scheduling said updating schedule entry to be woken up at the particular slot; and (c) for the case where said updating schedule entry will be ineligible after said adjusting its said number of tokens and at least until a next occurrence of its said associated fill slot: said adjusting its said number of tokens includes: increasing its number of tokens by an amount based on its token slot fill rate and the number of slots identified by the current time slot since its said last filled slot value; and wherein said updating the updating schedule entry corresponding to said next schedule entry further includes reducing its said number of tokens by an amount corresponding to said servicing.

* * * * *

UNITED STATES PATENT AND TRADEMARK OFFICE
CERTIFICATE OF CORRECTION

| | |
|---|---|
| PATENT NO. | : 7,843,940 B2 |
| APPLICATION NO. | : 11/141776 |
| DATED | : November 30, 2010 |
| INVENTOR(S) | : Doron Shoham |

It is certified that error appears in the above-identified patent and that said Letters Patent is hereby corrected as shown below:

Col. 13, lines 62-63, delete "to fill is identified"

Col. 17, line 16, Claim 14, delete "medium"

Signed and Sealed this
Fifteenth Day of March, 2011

David J. Kappos
*Director of the United States Patent and Trademark Office*